(12) United States Patent
Valdes Colina

(10) Patent No.: US 10,109,990 B2
(45) Date of Patent: Oct. 23, 2018

(54) SECTIONS OF CABLE TRAYS

(71) Applicant: Valdinox, S.L., Meruelo-Cantabria (ES)

(72) Inventor: Justo Manuel Valdes Colina, Meruelo-Cantabria (ES)

(73) Assignee: Valdinox, S.L. (ES)

( * ) Notice: Subject to any disclaimer, the term of this patent is extended or adjusted under 35 U.S.C. 154(b) by 25 days.

(21) Appl. No.: 15/314,178

(22) PCT Filed: May 26, 2015

(86) PCT No.: PCT/ES2015/070409
§ 371 (c)(1),
(2) Date: Jun. 6, 2017

(87) PCT Pub. No.: WO2015/181421
PCT Pub. Date: Dec. 3, 2015

(65) Prior Publication Data
US 2017/0271855 A1 Sep. 21, 2017

(30) Foreign Application Priority Data
May 27, 2014 (ES) .................................. 201430783

(51) Int. Cl.
| F16L 3/00 | (2006.01) |
| H02G 3/04 | (2006.01) |
| F16L 3/26 | (2006.01) |
| F16B 5/06 | (2006.01) |

(52) U.S. Cl.
CPC ............. *H02G 3/0456* (2013.01); *F16B 5/06* (2013.01); *F16L 3/26* (2013.01)

(58) Field of Classification Search
CPC . F16L 3/13; F16L 3/223; F16L 3/2235; F16L 3/00; F16L 3/02; F16L 3/08
USPC ............................... 248/49.65, 68.1, 73, 74.4
See application file for complete search history.

(56) References Cited

U.S. PATENT DOCUMENTS

| 3,042,351 A | 7/1962 | Du Bois | |
| 6,247,871 B1 * | 6/2001 | Nickel | H02G 3/0443 211/126.3 |
| 7,841,566 B2 * | 11/2010 | Kellerman | H02G 3/0608 248/49 |
| 8,250,717 B2 * | 8/2012 | Boone | H01R 4/2408 24/514 |

(Continued)

FOREIGN PATENT DOCUMENTS

| EP | 2254211 A2 | 11/2010 |
| ES | 1076189 | 2/2012 |

(Continued)

*Primary Examiner* — Steven M Marsh
(74) *Attorney, Agent, or Firm* — Hayes Soloway PC

(57) ABSTRACT

The cable tray comprises an anchoring element (3) arranged on the front end thereof, for connecting the rear end of the following tray section, said anchoring element (3) comprising a bar with a fold (4), the extensions (5) of which are fitted through the transverse bars of the walls and/or base and project past the last transverse bar (7) leading into bends (8, 9) and then two branches (11) which end in the fold (4), said branches (11) having different inclinations in relation to each other and in relation to the vertical plane so that the connection of the tray sections forms a tray that resists sudden oscillations or movements that may be generated during the assembly thereof or once installed.

20 Claims, 3 Drawing Sheets

(56) References Cited

U.S. PATENT DOCUMENTS

| | | | |
|---|---|---|---|
| 9,112,340 B2* | 8/2015 | Mayo | A47F 5/01 |
| 9,293,899 B2* | 3/2016 | Rouleau | H02G 3/0443 |
| 9,784,938 B2* | 10/2017 | Kellerman | G02B 6/4471 |
| 2005/0040295 A1* | 2/2005 | Sinkoff | H02G 3/0443 |
| | | | 248/58 |
| 2005/0063775 A1* | 3/2005 | Boltz | H02G 3/0443 |
| | | | 403/397 |
| 2014/0151513 A1* | 6/2014 | Valdes Colina | H02G 3/0443 |
| | | | 248/49 |

FOREIGN PATENT DOCUMENTS

| | | |
|---|---|---|
| ES | 2396209 | 2/2013 |
| ES | 1078809 | 3/2013 |
| ES | 2428501 | 11/2013 |

* cited by examiner

I  II

SECTIONS OF CABLE TRAYS

OBJECT OF THE INVENTION

The object of this invention is a section of cable tray that contains, integrated into its structure, an anchoring element that joins the front end of one tray section to the rear end of another tray section to form, by the assembly of successive sections, the tray along which the electrical wiring and/or telecommunications installations run.

This anchoring element is especially conceived for the formation of wire mesh cable trays, which are formed by the arrangement of longitudinal bars and other transverse bars that form a grid that is bent on its sides at a 90° angle in order to configure a channel with a base and side walls.

STATE OF THE ART

The cable tray is usually configured in the same installation location, generally several meters high, by means of the connection of successive tray sections that have been manufactured with a specific length. Therefore, it is important to create an assembly system for the sections that can be easily carried out by an operator stationed on a ladder or a lift, and that ensures a secure connection.

The connection systems that are carried out by means of staples or other elements that require complementary screws or nuts for their correct attachment are known. The disadvantage is that they are difficult to connect, requiring more than one operator for their assembly.

Spanish patent number 1,078,809 is owned by the same applicant and describes a tray section that has an anchoring element incorporated on its front end, side walls and/or base, which allows the assembly of the rear end of the following tray section to form the tray that connects several sections, without needing additional accessories; this anchoring element is configured by means of a bar bent into two parts. The folded bar has straight parallel extensions that are welded onto the transverse bars of the tray section, and said extensions project past the end of the tray section; the extensions lead into bends: the first bend forms an inward portion entering the tray, followed by another bend that projects towards the exterior of the tray. To finish the anchoring element on branches that end in the "V"-shaped fold, branches along which the last transverse bar of the rear end of the joining tray section slides, said bar falls into the gap that exists between the first bend and the first transverse bar of the front end of the tray section that has the anchoring element.

The improvements provided by the new invention aim to give the anchoring element greater consistency so that the tray formed by successive, joined sections can support different degrees of traction or large oscillations, without the possible separation or detachment of any of the sections in situations where the trays are placed on mobile structures or when there are earthquakes, for example.

This tray section meets the objectives of quick and easy assembly between the sections, without additional accessories, and is carried out by simply pressing the front end of the tray section that contains the anchoring element against the rear end of the joining tray section.

DESCRIPTION OF THE INVENTION

The tray sections object of this invention are manufactured with longitudinal bars upon which transverse bars, joined by welding at the contact points, are placed; this is done to form a mesh that is bent in the factory in order to create a tray section: a channel with a base and two side walls. The longitudinal and transverse bars, in this type of wire mesh tray, normally have a circular cross section and they all have the same diameter.

These tray sections object of the invention have an anchoring element that is integrated into the tray section and is located on the walls and/or base of the front end of the section; said anchoring element is made up of a folded bar that has two extensions on the end opposite the fold which are attached to the wall of the front end of the tray section; these extensions project towards the exterior of the tray beyond the last transverse bar, the extensions followed by bends that in turn are followed by an inward portion towards the interior of the tray, followed by other bends that are followed by two branches that end in the area of the fold, which can be at a point, configuring a "V" shape along with the branches of the anchoring element, or in other shapes, such as a "U".

This anchoring element will be installed, preferably, on the two walls of the tray section, and can also be installed on the base.

By having the extensions projected beyond the last transverse bar, and following there being a bend towards the interior, a gap is created between this last transverse bar of the front end of the tray section where the anchoring element is installed and the first bend directed towards the interior of the tray.

Two tray sections are assembled by positioning the last transverse bar of the rear end of the tray section to join on the branches of the anchoring elements arranged in the walls of the front end of the receiving tray section. The operator will simply have to push this joining tray section against the branch of the anchoring element, and the transverse bar of this section to join will slide along said branches in order to fall into the gap formed by the bend with the inward portion towards the interior of the tray and the last transverse bar, thus being the two tray sections assembled.

As already mentioned, the extensions of the anchoring element project on a portion beyond the last transverse bar, where the length of the portion is determined by the gap where the tray section to join will fit. Normally this portion will be suitable for the insertion of a transverse bar, but it can be projected to house two or more transverse bars of the tray section to join, depending on the design of other tray types, since there are types of cable trays where one of the ends of their sections has several transverse bars placed together, which will be those that fit into the gap.

The special feature of the object of this invention with respect to the patent of the same applicant is that the branches of the anchoring element have different inclinations in relation to each other and in relation to the vertical plane of the wall of the tray section where this anchoring element is attached; these inclinations ensure that the last transverse bar of the joining tray section, once fitted, cannot be displaced and dismounted, even when the tray has large oscillations that can be produced by the mounting process or afterwards, once the tray has already been installed.

The bar that configures the anchoring element preferably has the same circular cross section and diameter as the bars that form the tray section. In this way, the manufacture of the anchoring element is carried out with a product that is identical to the one that configures the tray section and the bars, and the joint between the anchoring element and the tray section is made through welding, in the same way that the transverse and longitudinal bars which form the cable tray are joined.

DESCRIPTION OF THE FIGURES

As a complement to the description provided herein, and for the purpose of helping to make the characteristics of the invention more readily understandable, the present specification is accompanied by a set of drawings constituting an integral part of the same, which, by way of illustration and not limitation, represent the following.

PREFERRED EMBODIMENT OF THE INVENTION

Figure 1:
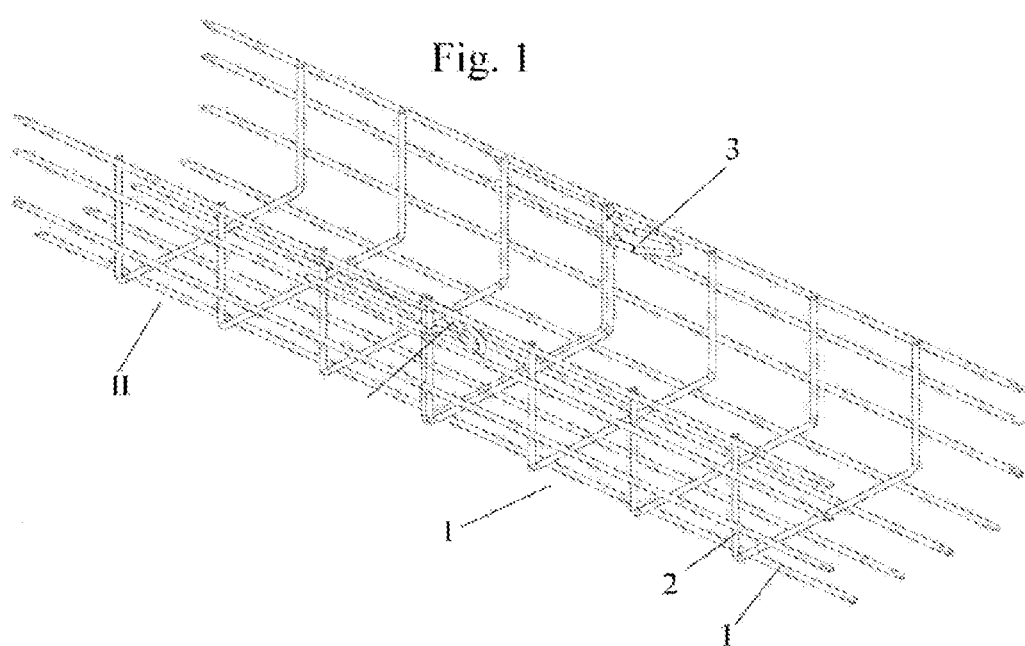
FIG. 1 shows a perspective view of two tray sections joined by anchoring elements.
Figure 2:
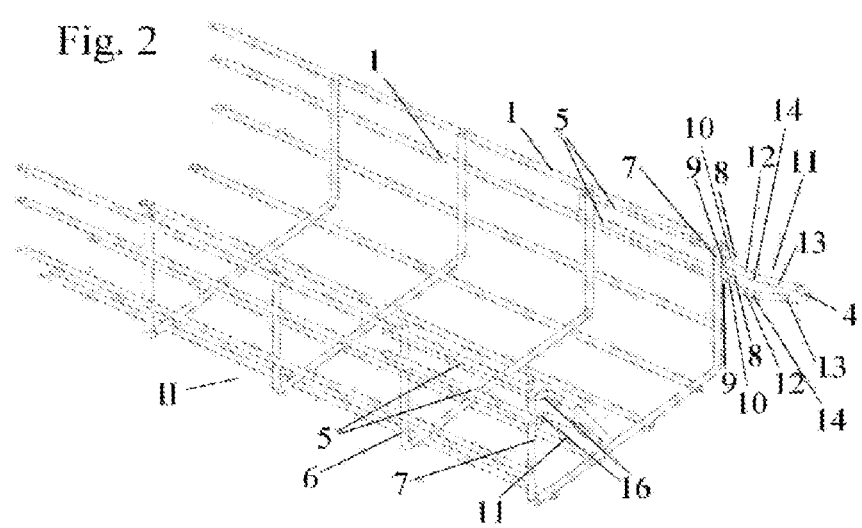
FIG. 2 shows the front end of a tray section with anchoring elements.
Figure 3:
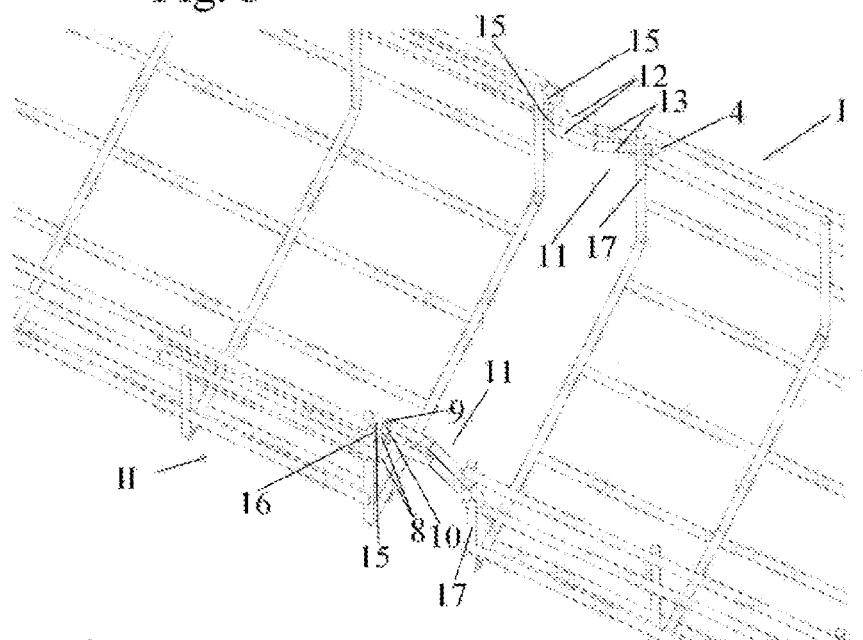
FIG. 3 shows the rear end of a tray section sliding along the branches of the anchoring elements located on the front end of the other tray section.

In accordance with the drawings, the cable tray is configured by successive joined tray sections (I, II, . . . ), where the two sections that appear in the shown figures shall be called tray section to join (I) and receiving tray section (II); each of the sections being created by longitudinal (1) and transverse (2) bars, with a circular cross section, forming a channel with a base and two side walls. Each of the sections comprises an anchoring element (3) located on each of the walls and/or base of one of its ends, formed by a bar bent into two parts, where the bar has the same circular cross section and diameter as the longitudinal and transverse bars that configure each cable tray section.

The folded bar has two extensions (5), straight and parallel to each other, on the end opposite the fold (4), which are attached to the wall of the front end of the tray section and are welded to the second-to-last and last transverse bars (6, 7); these extensions (5) project towards the exterior of the tray section on a portion (16) that extends beyond the last transverse bar (7), to then have first bends (8) that form inward portions (10) entering the tray, which inward portions (10) are perpendicular to the transverse bar (7) at a 90° angle; following, they have second bends (9) towards the exterior of the tray, at a 90° angle, these second bends (9) being followed by two branches (11) that end in the fold (4) which in this embodiment forms a "V" shape with the branches (11) of the anchoring element (3).

The angle formed by the first bend (8) and the inward portion (10) is smoothed at its vertex with a rounded shape that has a radius of between 4 and 8 millimeters.

The branches (11) of the anchoring element (3) project towards the following section to join (I), which is located next to the cable tray, and each of these branches (11) is divided into two straight portions: an intermediate portion (12), extending from the second bend (9) to the third bend (14), and the end portion (13), extending from the third bend (14) to the fold (4); the straight portions (12, 13) that are located at different inclinations in relation to each other and in relation to the vertical plane of the wall of the tray section where the anchoring element is attached (3). In this way, the intermediate portion (12) is located inside the tray, parallel to the longitudinal bars (1) where the anchoring element (3) is installed; and the end portion (13) has an inclination away from the tray, at an angle greater than 15° with respect to the vertical plane of the wall of the tray section where the anchoring element (3) is installed.

Figure 5:
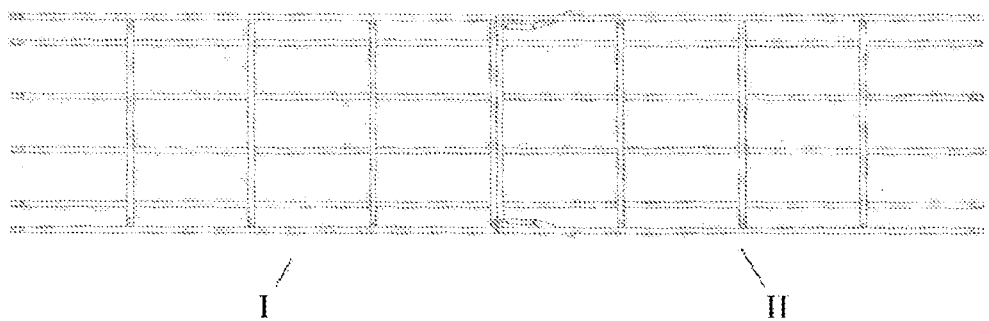
FIG. 5 shows two joined tray sections.

As shown in FIG. 5, the area that has the fold (4) of the anchoring element (3) is located on the same longitudinal plane as the longitudinal bars (1) of the vertical wall of the tray section where it is fitted or slightly protrudes from said wall.

The configuration of the tray section with its incorporated anchoring element (3) allows the two adjacent tray sections (I, II, . . . ) to be fitted by simply having the operator position the last transverse bar (17) of the rear end of the joining tray section (I) between the branches (11) of the anchoring element (3) arranged on the receiving tray section (II), facilitating the positioning of the end portions (13) to slide along them and along the intermediate portions (12), until it falls into the gap (15) formed between the first bend (8), the inward portion (10) and the last transverse bar (7) of the receiving tray section (II).

Figure 4:
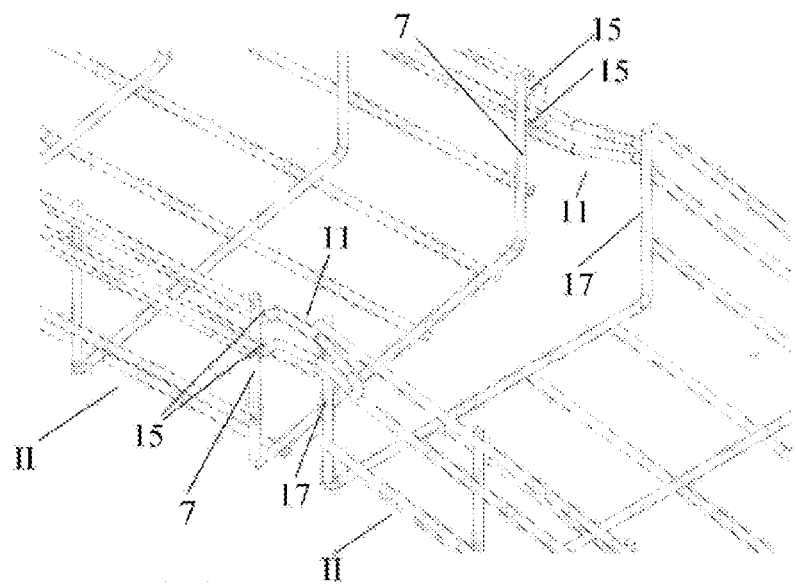
FIG. 4 shows another way of assembling the tray sections.

Another way of assembly in two stages is possible with this configuration, shown in FIG. 4: positioning one of the sides or walls of the last transverse bar (17) of the tray section to join (I) in the gap (15) of one of the anchoring elements (39) of the receiving tray section (II), and afterwards, turning the tray section to join (I) to slide the other wall of the tray section to join (I) along the branches (11), until it falls into the gap (15), of the other anchoring element (3) of the receiving tray section (II), in order to achieve assembly in this way.

The tray sections joined in this way configure a highly resistant cable tray. Tests have been conducted on the joining of three 3 m long tray sections, forming a 9 m long tray, oscillating its structure from the two ends with up and down movement forces; the tray remained unaltered, without any tray section becoming unattached.

Having sufficiently described the nature of the invention, in addition to an example of preferred embodiment, it is hereby stated for the relevant purposes that the materials, shape, size and layout of the described elements may be modified, provided that it does not imply altering the essential characteristics of the invention claimed below.

The invention claimed is:

1. A first section of cable tray comprising:
   longitudinal bars;
   transverse bars;
   herein the longitudinal bars and the transverse bars are joined in order to create the first section of cable tray and to provide the first section of cable tray with a channel having a base and two side walls;
   at least one anchoring element in the shape of a folded bar comprising a first end comprising a fold and a second end opposite the fold which has two extensions that are parallel to each other and are welded to at least one of the side walls and the base of a first end of the first section of cable tray
   wherein the two extension are projected by means of two portions beyond the first end of the first section of cable tray, wherein the two portions are followed by first bends towards the interior of the first section of cable tray that form inward portions that are followed by second bends, to thereafter configure two branches that fit into at least one of a wall and a base of a second section of cable tray;
   wherein each branch comprises two straight portions directed towards the second section of cable tray: an intermediate portion that is located after the second bend up to a third bend, followed by an end portion, where the intermediate portion and the end portion have different inclinations in relation to each other and in relation to at least one of the side wall and the base of the first section of cable tray where each anchoring element is welded.

2. The first section of cable tray of claim 1, wherein each intermediate portion is parallel to the longitudinal bars where each anchoring element is welded.

3. The first section of cable tray of claim 1, wherein each end portion has an inclination away from the first section of cable tray, at an angle greater than 15° with respect to the side wall and/or the base of the first section of cable tray where each anchoring element is welded.

4. The first section of cable tray of claim 1, wherein the first bend forms an angle between 45° and 90° with respect to the side wall and/or the base of the first section of cable tray where each anchoring element is welded.

5. The first section of cable tray of claim 1, wherein the first bend forms an angle of 90° with respect to the side wall and/or the base of the first section of cable tray where each anchoring element is welded.

6. The first section of cable tray of claim 1, wherein the second bend forms an angle between 45° and 90° with respect to the side wall and/or the base of the first section of cable tray where each anchoring element is welded.

7. The first section of cable tray of claim 1, wherein the second bend forms an angle of 90° with respect to the side wall and/or the base of the first section of cable tray where each anchoring element is welded.

8. The first section of cable tray of claim 1, wherein the folded bar that configures each anchoring element has the same cross section and diameter as the longitudinal bars and the transverse bars that configure the first section of cable tray.

9. The first section of cable tray of claim 1, wherein the bar that configures each anchoring element has a circular cross section.

10. The first section of cable tray of claim 1, wherein the end portions end in the fold of the first end of each anchoring element, wherein the fold forms a "V" shape with the end portions.

11. The first section of cable tray of claim 1, wherein the fold of the first end of each anchoring element is a straight section, where the fold and the end portions forms a "U"-shape.

12. The first section of cable tray of claim 1, wherein the first bend is followed by an inward portion entering the first section of cable tray that is perpendicular to a transverse bar.

13. The first section of cable tray of claim 12, wherein the first bend and the inward portion form an angle with a vertex smoothed into a rounded shape, wherein the rounded shape has a radius of between 4 and 8 millimeters.

14. A cable tray system, comprising:
a first section of cable tray and a second section of cable tray that each comprise:
longitudinal bars;
transverse bars;
wherein the longitudinal bars and the transverse bars are joined in order to create the first and second sections of cable tray and to provide the first and second sections of cable tray with a channel having a base and two side walls;
at least one anchoring element in the shape of a folded bar comprising a first end comprising a fold and a second end opposite the fold which has two extensions that are parallel to each other and are welded to at least one of the side walls and the base of a first end of the first section of cable tray
wherein the two extension are projected by means of two portions beyond the first end of the first section of cable tray, wherein the two portions are followed by first bends towards the interior of the first section of cable tray that form inward portions that are followed by second bends, to thereafter configure two branches that fit into at least one of a wall and a base of the second section of cable tray;
wherein each branch comprises two straight portions directed towards the second section of cable tray: an intermediate portion that is located after the second bend up to the third bend, followed by an end portion, where the intermediate portion and the end portion have different inclinations in relation to each other and in relation to at least one of the side wall and the base of the first section of cable tray where each anchoring element is welded.

15. The system of claim 14, wherein each intermediate portion is parallel to the longitudinal bars where each anchoring element is welded.

16. The system of claim 14, wherein each end portion has an inclination away from the first and second sections of cable tray, at an angle greater than 15° with respect to the side wall and/or the base of the first and second sections of cable tray where each anchoring element is welded.

17. The system of claim 14, wherein the first bend forms an angle between 45° and 90° with respect to the side wall and/or the base of the first section of cable tray where each anchoring element is welded.

18. The system of claim 14, wherein the first bend forms an angle of 90° with respect to the side wall and/or the base of the first section of cable tray where each anchoring element is welded.

19. The system of claim 14, wherein the second bend forms an angle between 45° and 90° with respect to the side wall and/or the base of the first section of cable tray where each anchoring element is welded.

20. The system of claim 14, wherein the second bend forms an angle of 90° with respect to the side wall and/or the base of the first section of cable tray where each anchoring element is welded.

* * * * *